US012361921B2

(12) United States Patent
Callery et al.

(10) Patent No.: US 12,361,921 B2
(45) Date of Patent: Jul. 15, 2025

(54) METHOD AND SYSTEM FOR ARTIFICIAL REVERBERATION EMPLOYING REVERBERATION IMPULSE RESPONSE SYNTHESIS

(71) Applicants: Eoin Francis Callery, Limerick (IE); Jonathan Stuart Abel, Menlo Park, CA (US); Kyle Swenson Spatt, Austic, TX (US)

(72) Inventors: Eoin Francis Callery, Limerick (IE); Jonathan Stuart Abel, Menlo Park, CA (US); Kyle Swenson Spatt, Austic, TX (US)

(*) Notice: Subject to any disclaimer, the term of this patent is extended or adjusted under 35 U.S.C. 154(b) by 263 days.

(21) Appl. No.: 17/856,850

(22) Filed: Jul. 1, 2022

(65) Prior Publication Data

US 2023/0018926 A1 Jan. 19, 2023

Related U.S. Application Data

(60) Provisional application No. 63/218,361, filed on Jul. 4, 2021.

(51) Int. Cl.
*H04S 3/00* (2006.01)
*G10K 15/12* (2006.01)

(52) U.S. Cl.
CPC .............. *G10K 15/12* (2013.01); *H04S 3/008* (2013.01); *H04S 2400/01* (2013.01)

(58) Field of Classification Search
None
See application file for complete search history.

(56) References Cited

U.S. PATENT DOCUMENTS 7,039,194 B1 * 5/2006 Kemp .................... G10K 15/02 381/103
2003/0172097 A1 * 9/2003 McGrath ................ H04S 7/305 708/300

(Continued)

OTHER PUBLICATIONS

Tarr, Eric. "How to Add a Custom Tonal Reverb to Your Mix." YouTube, Pro Audio Files, Sep. 28, 2015, www.youtube.com/watch?v=PkuJTEnb1bE. Citations made to video timestamps and transcript. (Year: 2015).*

(Continued)

*Primary Examiner* — James K Mooney
(74) *Attorney, Agent, or Firm* — Foley & Lardner LLP

(57) ABSTRACT

The present embodiments relate to audio effect processing, and more particularly to a method for creating reverberation impulse responses from prerecorded or live source materials forms the basis of a family of reverberation effects. In one embodiment, segments of audio are selected and processed to form an evolving sequence of reverberation impulse responses that are applied to the original source material—that is, an audio stream reverberating itself. In another embodiment, impulse responses derived from one audio track are applied to another audio track. In a further embodiment, reverberation impulse responses are formed by summing randomly selected segments of the source audio, and imposing reverberation characteristics, including reverberation time, wet equalization, wet-dry mix, and predelay. By controlling the number and timing of the selected source audio segments, the method produces a collection of impulse responses that represent a trajectory through the source material. In so doing, the evolving impulse responses will have the character of room reverberation while also expressing the changing timbre and dynamics of the source audio.

10 Claims, 13 Drawing Sheets
(9 of 13 Drawing Sheet(s) Filed in Color)

(56) References Cited

U.S. PATENT DOCUMENTS

| | | | | |
|---|---|---|---|---|
| 2009/0296962 A1* | 12/2009 | Shirakihara | G10K 15/12 | |
| | | | 381/111 | |
| 2021/0142815 A1* | 5/2021 | Bryan | G10L 21/02 | |
| 2022/0078567 A1* | 3/2022 | Siddiq | H04R 29/00 | |

OTHER PUBLICATIONS

Brandtsegg, et al., "Live Convolution with Time-Varying Filters". In: Applied Sciences 8.1 (2018). issn: 2076-3417. url:https://www.mdpi.com/2076-3417/8/1/103 (Year: 2018).*

Tarr, Eric. "How to Create Your Own Custom Impulse Responses." YouTube, Pro Audio Files, Sep. 30, 2015, https://www.youtube.com/watch?v=g-mG2H4fvGg (Year: 2015).*

"IR-L Convolution Reverb." Waves.com, Aug. 31, 2017, www.waves.com/plugins/ir-l-convolution-reverb. (Year: 2017).*

"Use Any Wav File as an Impulse Response with the Free Convology XT Reverb Plugin." Noisegate, Mar. 25, 2019, noisegate.com.au/use-any-wav-file-as-an-impulse-response-with-the-free-convology-xt-reverb-plugin/. (Year: 2019).*

Atoragon. "How to create guitar cab impulses from a song (free plugins and IR included!) Part 1/2.", atoragon.blogspot.com/2016/12/how-to-create-guitar-cab-impulses-from.html. (Year: 2016).*

* cited by examiner

METHOD AND SYSTEM FOR ARTIFICIAL REVERBERATION EMPLOYING REVERBERATION IMPULSE RESPONSE SYNTHESIS

CROSS-REFERENCE TO RELATED APPLICATIONS

The present application claims priority to U.S. Provisional Patent Application No. 63/218,361 filed Jul. 4, 2021, the contents of which are incorporated herein by reference in their entirety.

TECHNICAL FIELD

The present embodiments relate generally to audio effects processing, particularly artificial reverberation and room acoustics.

BACKGROUND

Various methods for creating artificial reverberation have enhanced musical, theatrical, and other performing arts activities since the 1920s (Vesa Välimäki et al. "Fifty Years of Artificial Reverberation". In: IEEE Transactions on Audio, Speech, and Language Processing 20.5 (2012), pp. 1421-1448. doi: 10.1109/TASL.2012.2189567; Vesa Välimäki et al. "More than 50 Years of Artificial Reverberation". In: Journal of Audio Engineering Society (January 2016).). Over the course of the last century, audio engineers and artists have used a variety of methods for incorporating the acoustic signature of spaces or objects into their work, manipulating sounds so that they exhibit reverberation-like characteristics (Lewis S. Goodfriend and John H. Beaumont. "The Development and Application of Synthetic Reverberation systems". In: journal of the audio engineering society 7.4 (October 1959), pp. 228-234, 250.).

Further to this, audio engineers and artists have used these processes not only to generate acoustic effects, but also in combination with or solely for the timbral characteristics that are produced (Jonathan Sterne. "Space Within Space: Artificial Reverb and the Detachable Echo". In: Grey Room (2015), pp. 110-131.). With the dawn of affordable electronics and computing, a variety of digital methods for synthesizing artificial reverberation have been developed. An extensive review of these approaches, and how they function in the contexts of current audio engineering and artistic practices, is presented by Jean-Marc Jot in "Efficient Reverb Rendering for Auditory Scenes," www.youtube.com 2017.

It is arguable that the best option for the creation of realistic acoustic effects through digital processing emerged in more recent times in the form of low-latency convolution reverberation. Convolution reverberation processes dry sounds according to impulse response measurements from real places and objects, allowing for the imprinting of the sonic characteristics of that space or object onto dry sounds (William G. Gardner. "Efficient Convolution without Input-Output Delay". In: J. Audio Eng. Soc 43.3 (1995), pp. 127-136. ; Andrew Reilly and David McGrath. "Convolution Processing for Realistic Reverberation". In: journal of the audio engineering society (February 1995); D. S. McGrath. Method and apparatus for filtering an electronic environment with improved accuracy and efficiency and short flow-through delay. U.S. Pat. No. 5,502,747. 26 1996; Christian Müller-Tomfelde. "Low-Latency Convolution for Real-Time Applications". In: Journal of the Audio Engineering Society (March 1999); Guillermo Garcia. "Optimal Filter Partition for Efficient Convolution with Short Input/Output Delay". In: Audio Engineering Society Convention 113. October 2002. ).

Measuring an impulse response involves recording some manner of energetic, broadband test signal in a space—say, a balloon pop or swept sinusoid—which activates the resonant characteristics of that space. Any other sound can then be convolved with that measured impulse response, and is thus filtered in a manner that creates the impression that the sound was made in the space in which the test signal was recorded (Angelo Farina. "Simultaneous Measurement of Impulse Response and Distortion with a Swept-Sine Technique". In: Audio Engineering Society Convention 108. February 2000,; Jonathan Abel et al. "Estimating Room Impulse Responses from Recorded Balloon Pops". In: Audio Engineering Society Convention 129. Vol. 2. November 2010.). With the increased use of real-time convolution effects for music, virtual acoustic, or interactive scenarios, commercial audio effects companies such as iZotope now post detailed tutorials on their websites that explore and demonstrate how to create and use reverberation impulse responses and convolution reverberation effects for a wide range of home and professional audio projects (iZotope. The Basics of Convolution in Audio Production. www.izotope-.com 2006.). Additionally, methods for the real-time creation and updating of impulse responses for convolution effects in live music scenarios have been explored by Brandtsegg, et al., "Live Convolution with Time-Varying Filters". In: Applied Sciences 8.1 (2018). issn: 2076-3417. www.mdpi-.com.

Finally, in parallel to the development of convolution reverberation techniques, many artists and researchers have also investigated the related idea of cross-synthesis, in which one sound with a broad frequency spectrum is modulated by another signal (Julius O. Smith. Spectral Audio Signal Processing. online book, 2011 edition. June 2021.). Whether through the use of vocoders in popular music or through more experimental cross-synthesis computer music practices, such explorations of methods for the timbral imprinting and morphing of one sound onto another, offer motivation for methods to synthesize or process reverberation impulse responses.

Note that a typical audio track, say of music or a field recording, has certain timbre and dynamics characteristics that evolve over time. By contrast, a room impulse response has a very constrained timbre and dynamics, being composed of a set of transient early arrivals and a noise-like, exponentially decaying late field. What is lacking is a mechanism for combining the timbre and dynamics of an audio track with the psychoacoustically meaningful features of a reverberation impulse response.

Thus there is a need for a method to synthesize reverberation impulse responses in a way that expresses the timbre and dynamics of a source audio track, while retaining the characteristics of a reverberation impulse response. There is also a need for a method to interactively imprint the reverberation impulse responses so produced on target audio tracks. Furthermore, there is a need for a method to synthesize and imprint a sequence of such reverberation impulse responses in real time, for audio production, live performance, and virtual acoustics applications.

It is against this technological backdrop that the present Applicant sought a technological solution to these and other problems rooted in this technology.

SUMMARY

The present embodiments relate to audio effect processing, and more particularly to a method for creating reverberation impulse responses from prerecorded or live source materials forms the basis of a family of reverberation effects. In one embodiment, segments of audio are selected and processed to form an evolving sequence of reverberation impulse responses that are applied to the original source material—that is, an audio stream reverberating itself. In another embodiment, impulse responses derived from one audio track are applied to another audio track. In a further embodiment, reverberation impulse responses are formed by summing randomly selected segments of the source audio, and imposing reverberation characteristics, including reverberation time, wet equalization, wet-dry mix, and predelay. By controlling the number and timing of the selected source audio segments, the method produces an collection of impulse responses that represent a trajectory through the source material. In so doing, the evolving impulse responses will have the character of room reverberation while also expressing the changing timbre and dynamics of the source audio.

BRIEF DESCRIPTION OF THE DRAWINGS

The patent or application file contains at least one drawing executed in color. Copies of this patent or patent application publication with color drawing(s) will be provided by the Office upon request and payment of necessary fee.

These and other aspects and features of the present embodiments will become apparent to those ordinarily skilled in the art upon review of the following description of specific embodiments in conjunction with the accompanying figures, wherein.

DETAILED DESCRIPTION

Figure 1:
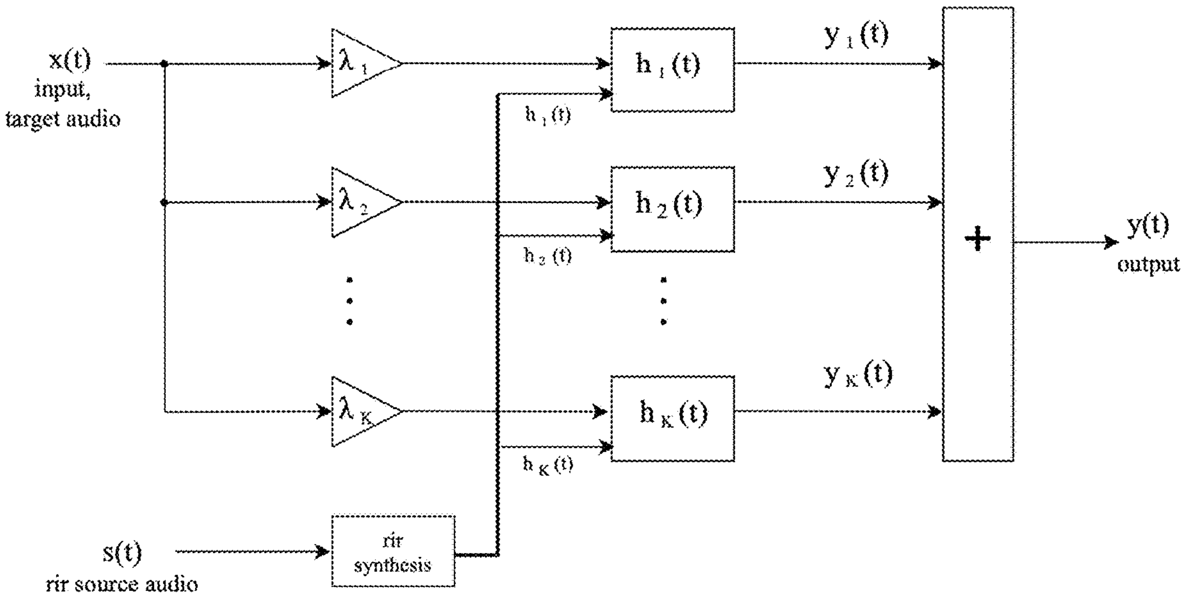
FIG. 1 is a block diagram illustrating an example implementation architecture, panning among convolution inputs according to embodiments.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Reverberation effects, whether seeking to create a spatial feeling or timbral effect, traditionally simulate the resonance of an object or acoustic space, say a room, spring, or plate. However, since convolution is, in simple terms, the frequency-domain multiplication of two spectra, there is no reason to use only signals derived from a physically constrained phenomenon to serve as the room impulse response. And so, while one can take an audio signal that resembles a room impulse response—the natural decaying of a chord stab, shaped or filtered noise signals, or other sound phenomena that resemble the envelope shape of a typical impulse response such as crashing water waves or thunder claps—and use this as an impulse response in a convolution process, there is no particular reason to limit oneself to working with room or object response-like audio files.

It will be observed that in most currently available commercial convolution audio effect plug-ins, users are allowed to select any uncompressed audio file for use as a "room" impulse response. This sound file must be altered by the plug-in so that it behaves like a transient noise source as played into or through a real—or modelled on real—object (Logic Pro User Guide. Logic Pro Space Designer Overview. 2021; Audioease. ALTIVERB. www.audioease.com 2021). In other words, the amplitude envelope of the sound files is altered so that its energy dissipates exponentially from the beginning of the file, as would happen to a noise burst if it was played into or through a space or object: the length of time it takes for the energy to dissipate being the reverberation time.

However, while prior art convolution processors allow one to synthesize a single reverberation impulse from an audio file, it is an object of the present invention to create families of reverberation impulse responses that express the changing timbral and dynamics characteristics throughout the duration of the source audio, be it entire songs or field recordings. It is another object of the present invention to imprint a sequence of such reverberation impulse responses on target audio tracks for both off-line and real-time scenarios.

The present Applicants discovered that by combining segments of the source audio drawn from multiple points in time into a segment of mixed audio, the timbre and dynamics of the source audio will be retained, and the mixed audio may be shaped into a reverberation impulse response. In one embodiment of the present disclosure, sets of randomly selected source audio segments are combined to form a set mixed audio segments. The mixed audio segments are then processed according to desired reverberation characteristics, such as wet-dry mix, wet equalization, predelay, and reverberation time, which may be frequency-dependent. The result being a family of reverberation impulse responses. The elements of the family may be monophonic or multichannel, and may contain any number of source audio segments or be selected from any section of the source audio, and aligned or not with the rhythmic structure of the source audio.

In another embodiment of the present disclosure, a sequence of impulse responses having the character of a source audio stream during selected time ranges is applied back onto the source audio, thereby performing a kind of auto reverberation in which the source is reverberated by successive aspects of itself. In a related embodiment, the reverberation impulse response sequence derived from the source audio is applied to a different audio stream, resulting in a cross reverberation.

In embodiments, the family of reverberation impulse responses are generated offline, and applied interactively. In other embodiments, both the reverberation impulse response generation and the application are live processes. In a further embodiment, a virtual acoustic system, such as described by Abel et al. "A Feedback Canceling Reverberator". In: Proceedings of the Digital Audio Effects Conference. 2018 and d&b audiotechnik en-space system. www.dbsoundscape.com 2018., present a sequence of reverberation impulse responses synthesized from source audio to create an interactive wide-ranging collection of reverberation environments.

Reverberation Impulse Response Synthesis

The present methods of auto-reverberation and cross-reverberation form and apply an evolving set of reverberation impulse responses derived from input audio. The formation of the impulse responses is in some ways similar to that of Jonathan Abel et al. "Estimating Room Impulse Responses from Recorded Balloon Pops". In: Audio Engineering Society Convention 129. Vol. 2. November 2010, J. Jot, Laurent Cerveau, and O. Warusfel. "Analysis and Synthesis of Room Reverberation Based on a Statistical Time-Frequency Model". In: Journal of The Audio Engineering Society (1997) and Kimberly Kawczinski et al. "Perceptual similarity and scaling of room reverberation features: Decay time and wet-dry ratio". In: The Journal of the Acoustical Society of America 148 (October 2020), pp. 2749-2749. in which a room impulse response is synthesized by first generating a noise signal, and then imposing on that noise signal room reverberation features such as a frequency-dependent exponential decay. Here, the noise signal is replaced with a mix of segments n(t) of a source audio signal s(t), t being the time index in samples. The resulting sequence of reverberation impulse responses $h_k(t)$, k=1; 2; : : :, is then applied to a target signal x(t) to produce an output signal y(t). By starting with sections of source audio rather than noise, the resulting reverberation impulse response will retain features of the timbre and dynamic character of the source audio.

To produce a given impulse response h(t), segments $s_r(t)$, r=1; 2, : : :; R of the source audio s(t) are summed to form a normalized wet response n(t), $$n(t) = \frac{1}{\sqrt{R}} \sum_{r=1}^{R} s_r(t). \quad (1)$$

Here, the rth signal segment is simply a T-long section of the source audio, starting at a time $t_r$, $$s_r(t)=s(t+t_r);\ t\in[0, T]; \quad (2)$$

and factor of $1=/\sqrt{R}$ is used to make the resulting normalized wet response energy roughly independent of the number of segments used.

The segments $s_r(t)$ are taken at randomly generated starting times, each with a duration that is sufficiently long to capture the perceivable decay of the resulting impulse response, for instance 1.5 times the desired 60 dB decay time. With many randomly selected segments used, say R=64, something of a central limit theorem effect produces a noise-like normalized response that has relatively uniform energy over time, but retains the spectral timbre of the source audio. When fewer segments are used, say R=16, the dynamic character of the source audio becomes evident, and with very few segments, say R=4, the source audio dynamics are prominent.

Figure 2:
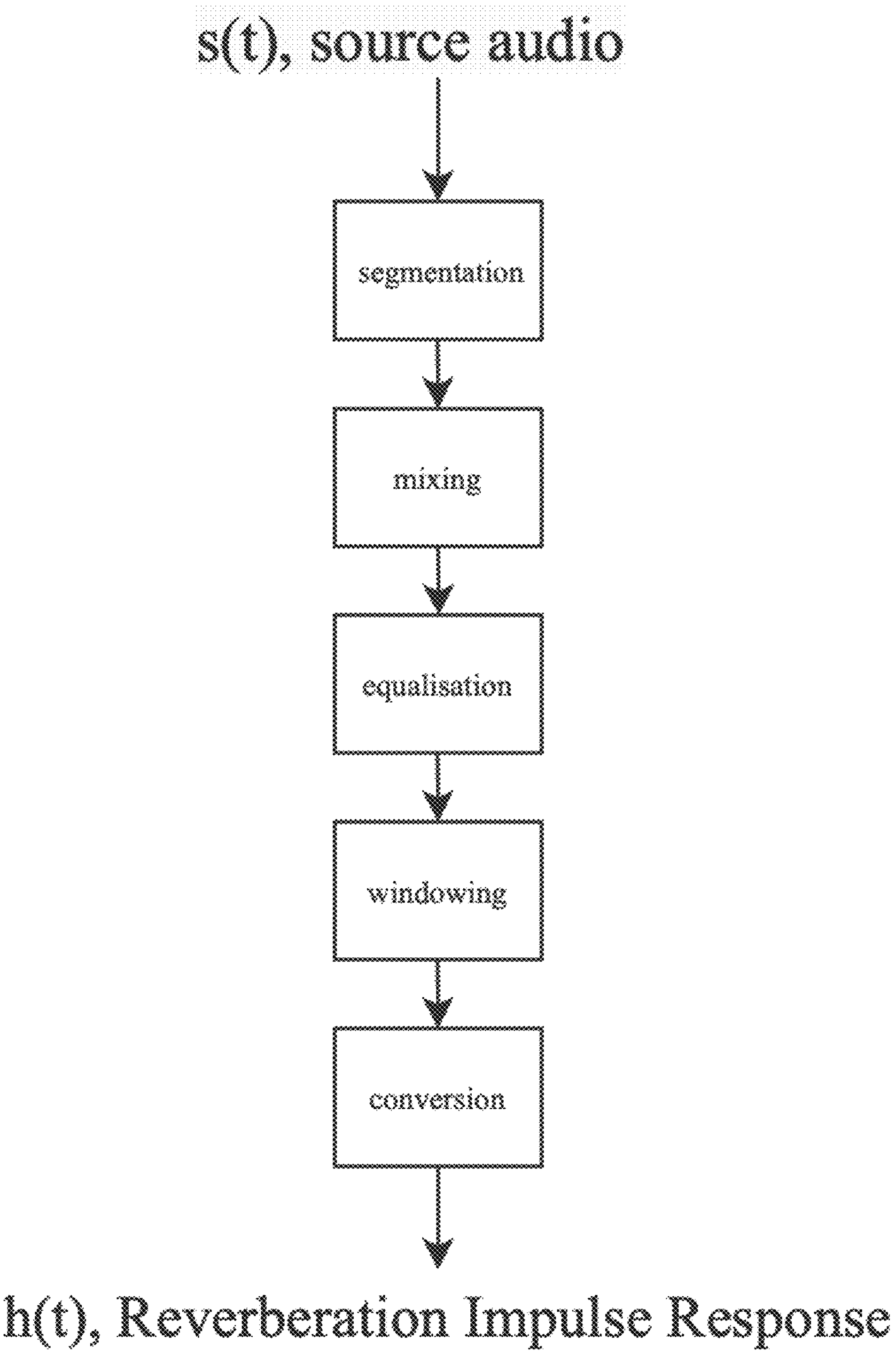
FIG. 2 illustrates an example reverberation impulse response synthesis method according to embodiments.

To convert the normalized wet response n(t) into a reverberation impulse response h(t), the normalized wet response is delayed, scaled, and windowed according to predelay, wet-dry mix, and reverberation time controls. Stated mathematically, $$h(t)=\gamma_D\delta(t)+\gamma_W n(t-\tau)e^{t\cdot ln(0.001)/T_{60}} \quad (3)$$

where δ(t) is a unit pulse at time t=0, $\gamma_D$ and $\gamma_W$ are, respectively, dry and wet gains, τ is the predelay, and $T_{60}$ is the 60 dB decay time. This process is shown in FIG. 2, in which source audio is sampled to form normalized response, and then processed to form a reverberation impulse response.

Note that reverberation controls can be applied in a frequency-dependent manner, for instance using the process described in Jonathan Abel et al. "Estimating Room Impulse Responses from Recorded Balloon Pops". In: Audio Engineering Society Convention 129. Vol. 2. November 2010 to convert balloon pop recordings into room impulse responses. The idea is to separate the normalized response n(t) into a set of band normalized responses $n_b(t)$, each occupying a different frequency band, with the property that their sum is the original normalized response. In doing so, the reverberation controls, such as the wet gain and decay time can be made frequency dependent, $$h(t) = \gamma_D\delta(t) + \sum_{b=1}^{B}\gamma_W(b)n_b(t-\tau)e^{t\cdot \ln(0.001)/T_{60}(b)} \quad (4)$$

In the method described above, the maximum duration of an impulse response is limited to the duration of the source file from which it comes. While this is not an issue for audio files that are more than several seconds long, there are use cases, particularly in virtual acoustic work, in which it is necessary to derive longer reverberation times from short duration source audio. To accommodate this need, the source audio may be stretched or looped or similarly extended in time as needed, e.g., using the modal time stretching methods as described in Jonathan S. Abel and Kurt J. Werner. "distortion and Picth Processing Using a Modal Reverberator". In: Proc. of the 18thInt. Conference on Digital Audio Effects (DAFx-15), Trondheim, Norway. 2015 and Alex Chechile et al. "VampireVerb: A Surreal Simulation of the Acoustics of Dracula's Castle". In: Proceedings of the 174th Meeting of the Acoustical Society of America. 2017.

Figure 4:
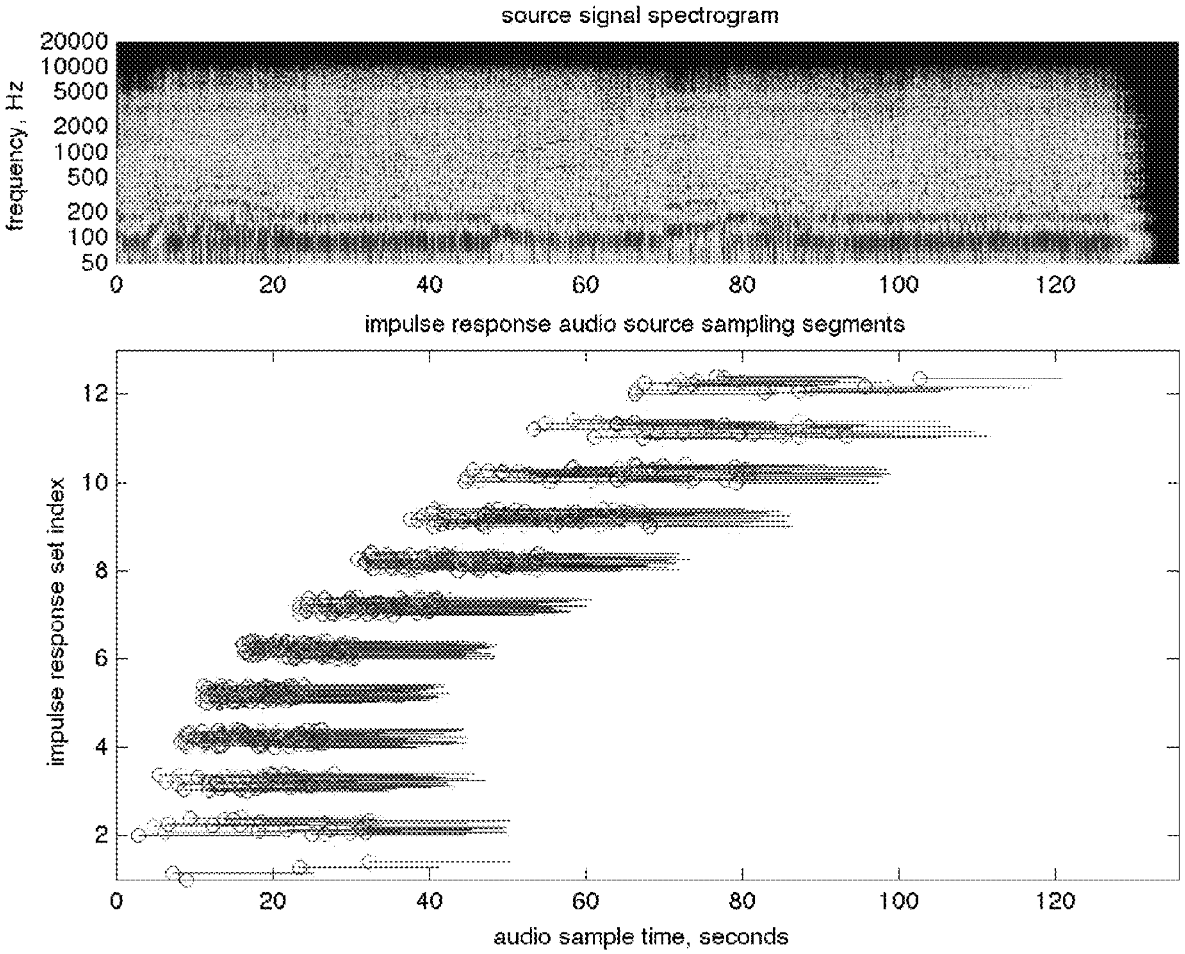
FIG. 4 illustrates an example source audio spectrogram (top) and selected segments used to form synthesized reverberation impulse responses (bottom).

The character of audio evolves over time, and often can be segmented into sections having distinct timbre, harmonic, and dynamics content. In generating a sequence of reverberation impulse responses, it is helpful to have in mind a trajectory through the source audio, say generating impulse responses based on selections from a pop song verse, then from the chorus, then a verse again. FIG. 4 shows source audio start times and durations for a set of reverberation impulse responses derived from Dick Dale's recording Misirlou (Dick Dale "Misirlou," Deltone Records. 1962).

Figure 5:
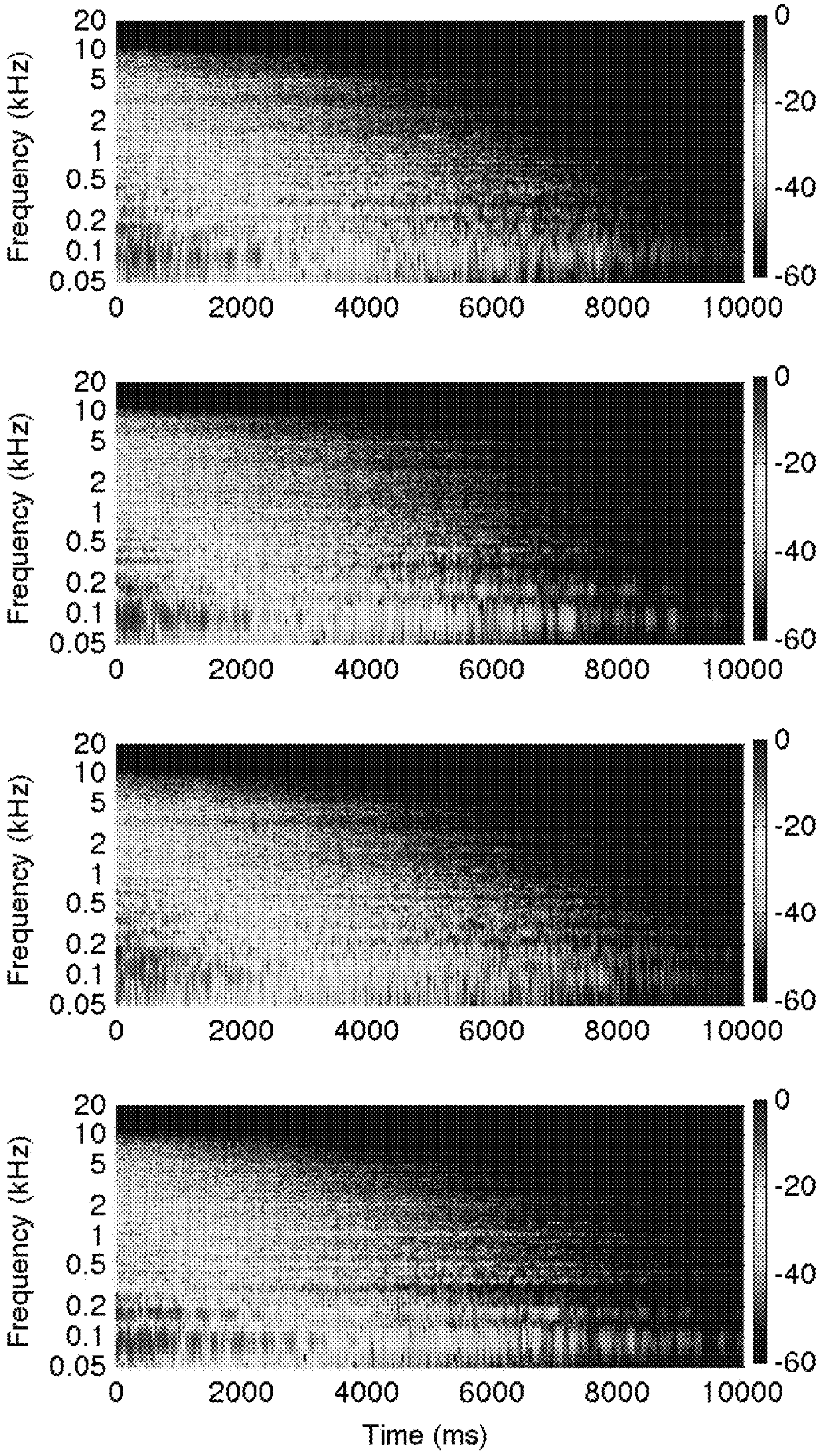
FIG. 5 illustrates example reverberation impulse response spectrograms formed from selections shown in FIG. 4.

Note that for the 12 impulse responses generated, the segment start times were randomly generated within an evolving window. Additionally, the number of source audio segments summed to form any given impulse response changed, from 4 for the first impulse response to 96 for the seventh to 16 for the twelfth. Example impulse response spectrograms are shown in FIG. 5.

Figure 6:
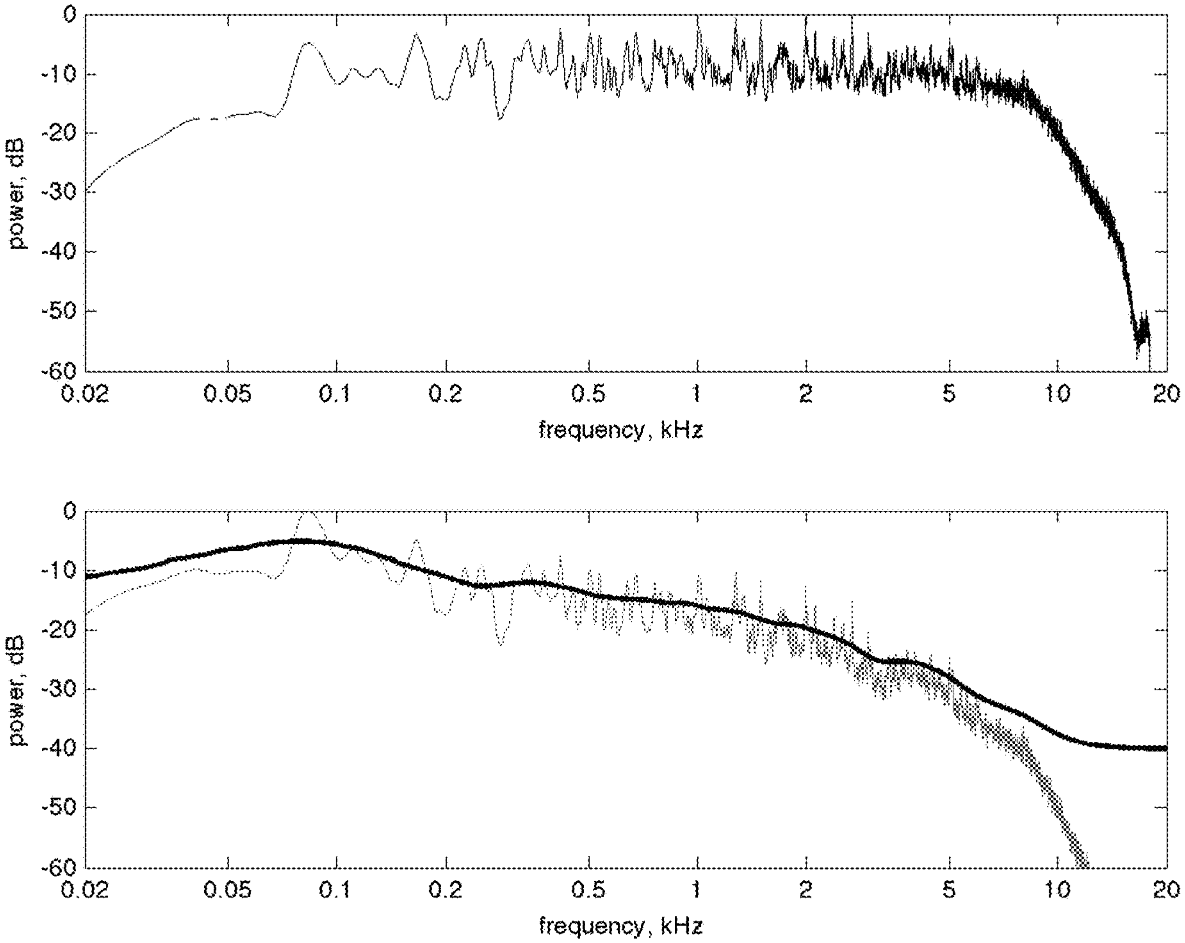
FIG. 6 illustrates example reverberation impulse response equalization: raw, critical-band smoothed magnitude response (bottom), equalized magnitude response (top).

It should be pointed out that the reverberation impulse responses $h_k(t)$ will take on the overall equalization of the source audio. If used to do auto-reverberation, the equalization of the source audio will be squared in the output audio. Accordingly, we suggest equalizing the reverberation impulse responses so as to make them roughly spectrally flat when smoothed over, say, a critical bandwidth. An example reverberation impulse response magnitude response and its critical band smoothed version is shown in FIG. 6 (bottom). The magnitude response of an equalized version of the reverberation impulse response is shown in FIG. 6 (top). It was formed by convolving the reverberation impulse response with the minimum-phase impulse response found by inverting the smoothed magnitude characteristic, while limiting the magnitude correction to 40 dB.

The equalization process may be generalized so as to give control over the relative amounts of narrow-band and broadband content in the resulting reverberation impulse responses. This has both artistic uses, and should mitigate the resonant peaking and dynamic issues which may arise.

Processing Architectures

Figure 3:
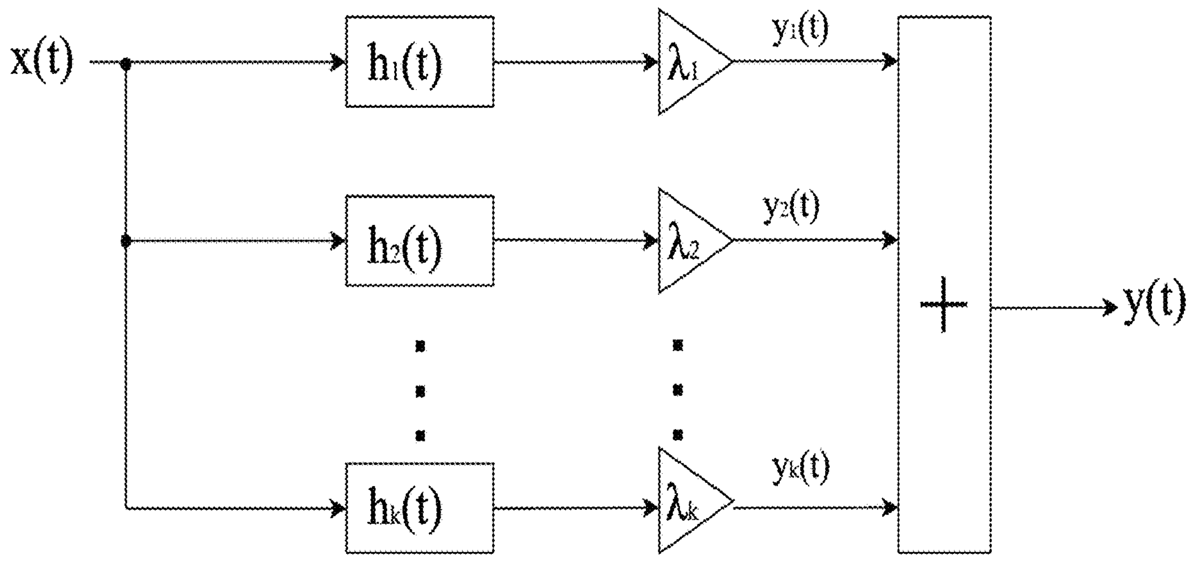
FIG. 3 is a block diagram illustrating another example implementation architecture, panning from convolution outputs according to embodiments.

To implement auto- or cross-reverberation, some embodiments, in effect, pan the target audio x(t) among the inputs of a parallel bank of K convolutional reverberators, each having a different reverberation impulse response $h_k(t)$, as seen in FIG. 1 (e.g. implemented as any combination of hardware and software in a digital audio workstation known to those skilled in the art). The convolution bank outputs $y_k(t)$ are summed to form the system output y(t). In this way, the trajectory through the space of reverberation impulse responses is arbitrary, and can be interactively controlled. By panning the target audio x(t) among the convolution bank inputs, as the audio leaves a particular convolution process, it produces an associated tail of reverberation at its output $y_k(t)$. An alternative architecture, shown in FIG. 3, is to apply the target input equally to all convolution inputs, and pan among the convolution outputs $y_k(t)$ to form the system output y(t). Doing so will create abrupt transitions, as the different reverberations $h_k(t)$ won't simultaneously exist outside the crossfade. Note that as the impulse responses are likely to be statistically independent, a power law panning rule is suggested, i.e., the panning weight squares should sum to one.

Note that the architecture of FIG. 1 can accommodate additional input signals without a noticeable increase in computational cost by adding the panned additional signal to the corresponding convolution inputs. In this way, each input signal has its own panning weights, but they all share the same convolutions. Similarly, the architecture of FIG. 3 allows efficient computation of multiple output signals by separately panning shared convolution outputs.

The process above is convenient when the source audio impulse responses are computed ahead of time, though it may be pricey computationally. To minimize computational cost, the number of convolutions may be reduced according to the number of convolutions producing output at any one time.

In the case that the impulse response computation is happening in real time, the architecture above could be used, with new reverberation impulse responses replacing outdated ones, for example in round robin fashion. An architecture with just two convolution processes can accommodate a process in which the reverberation impulse response is periodically updated, rather than resulting from panning among a set of responses.

One update method is a leaky integrator in which a new windowed source audio segment is mixed with the previous wet impulse response $g_{k-1}(t)$ to form the new wet impulse response $$g_k(t)=(1-\alpha)s_k(t)\exp\{t\cdot\ln(0.001)/T_{60}\}+\alpha g_{k-1}(t) \quad (5)$$

Figure 7:
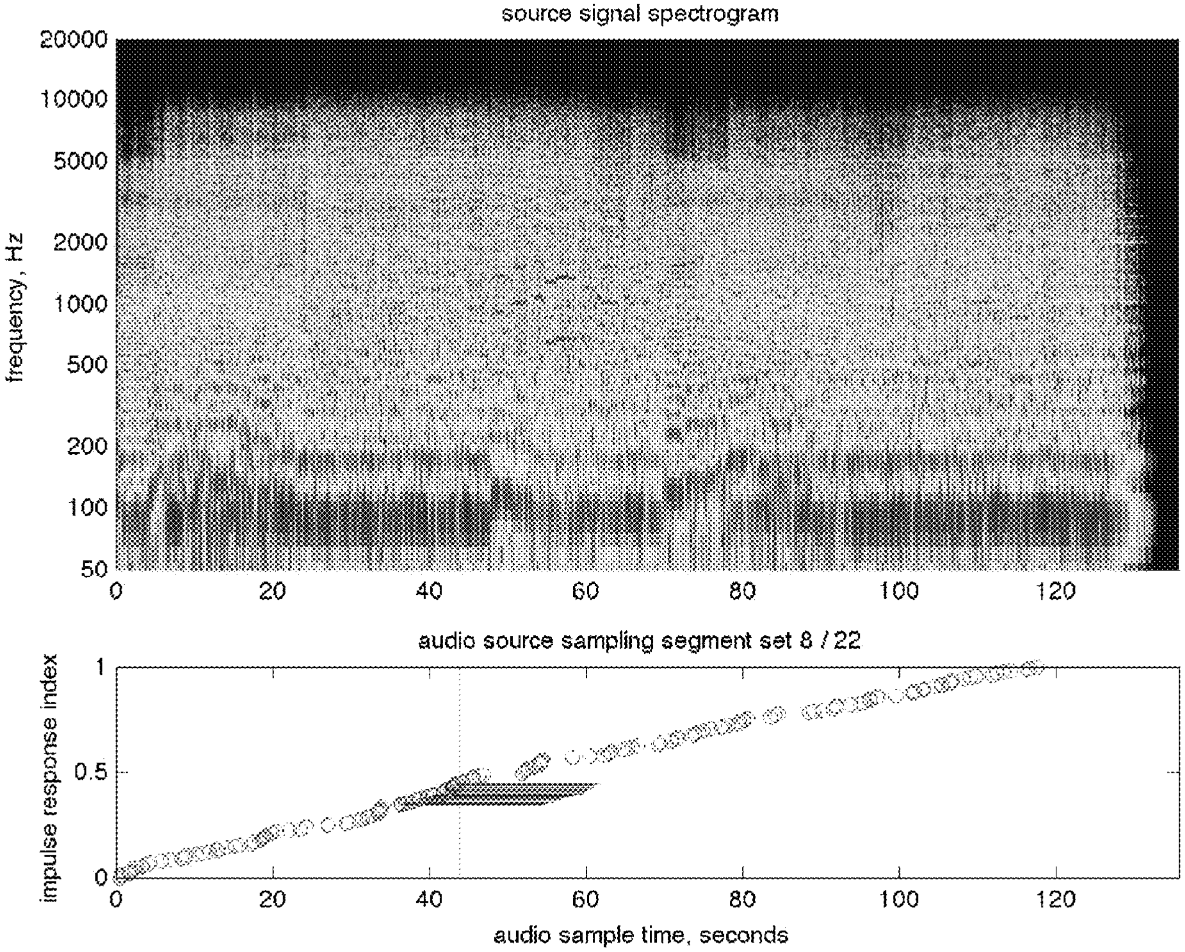
FIG. 7 illustrates example running source audio segment selection according to embodiments.

In this way, controls the number of updates over which a given source audio segment will influence the reverberation impulse response, in other words, the number of source audio segments that are effectively present in the reverberation impulse response at any one time. A similar method, illustrated in FIG. 7 allows the current reverberation impulse response to be the sum of the most recent R updates.

Figure 8:
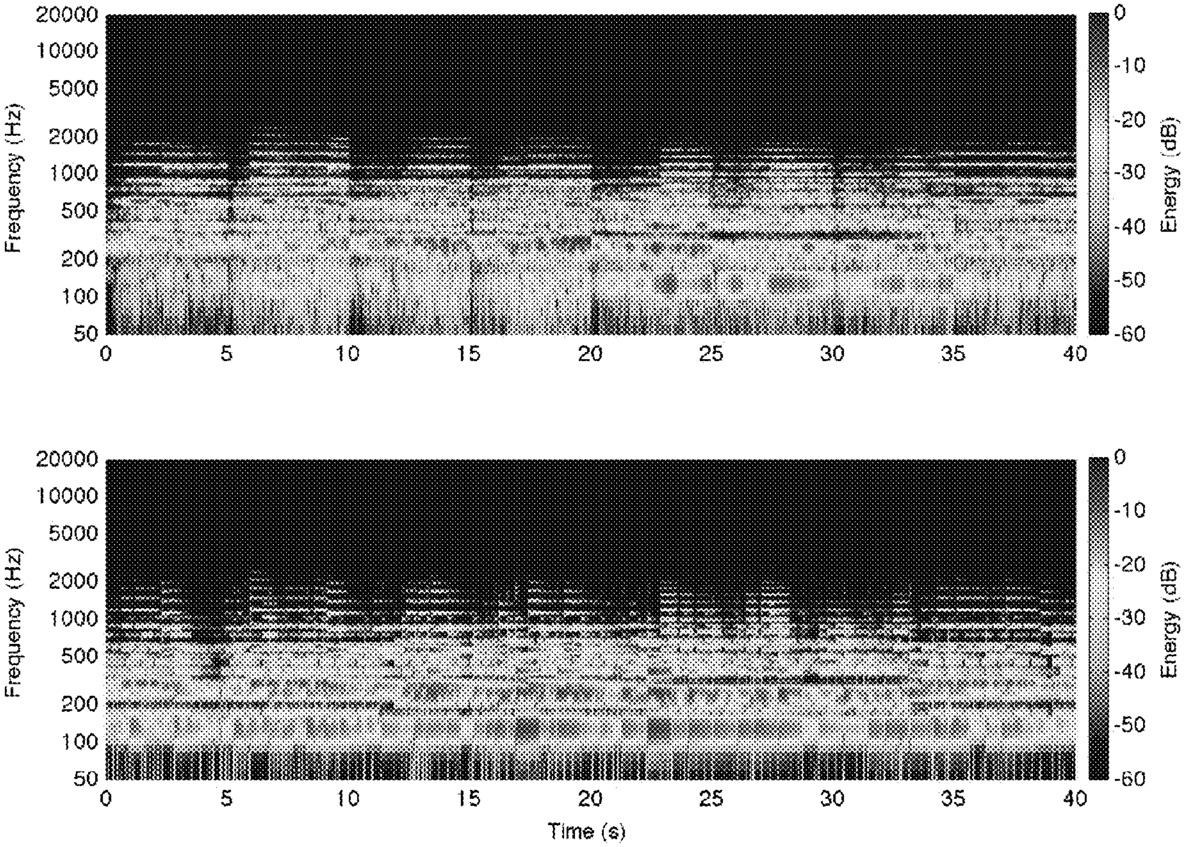
FIG. 8 illustrates example cross-reverberation of a live guitar spectrogram.
Figure 9:
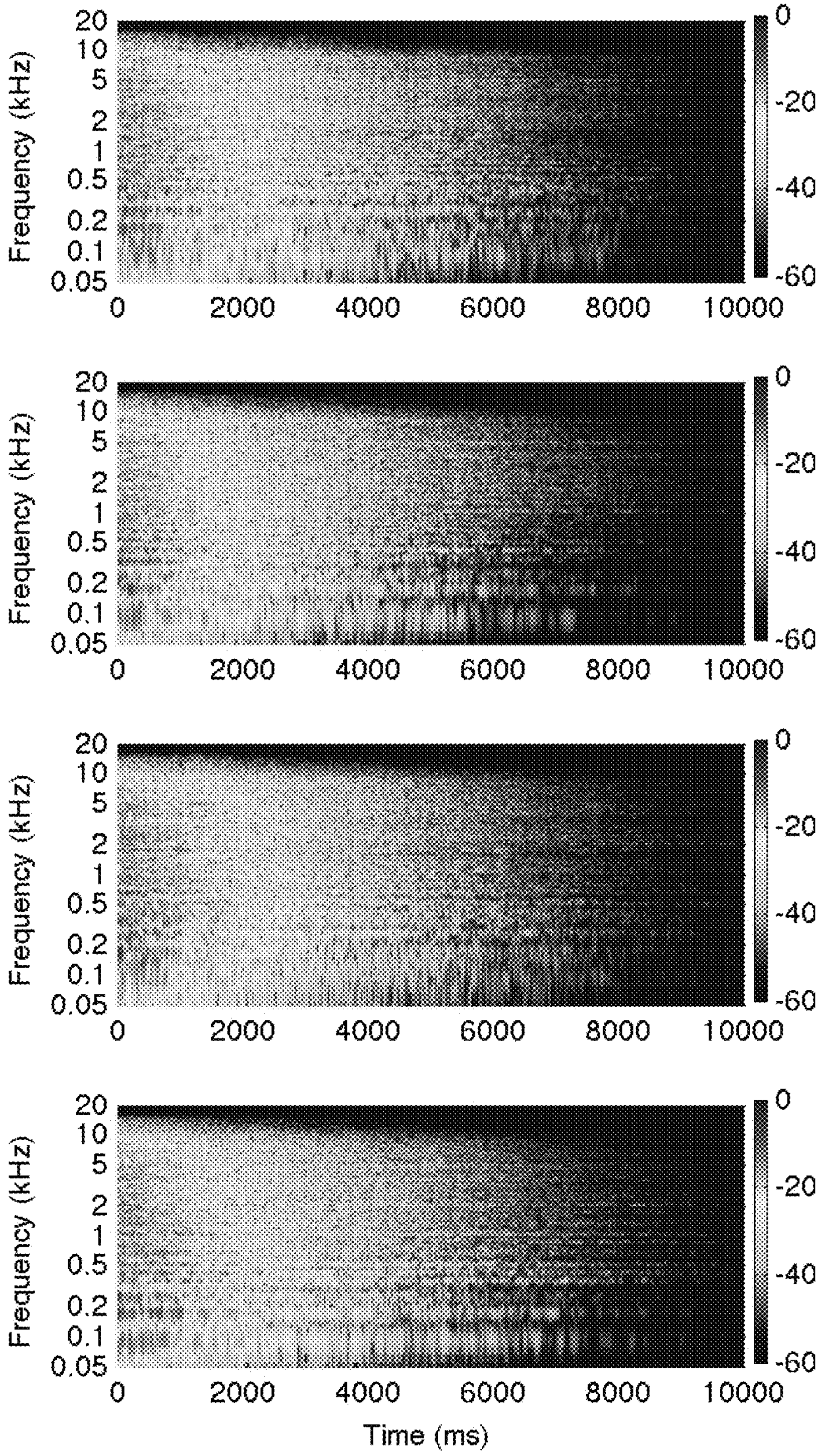
FIG. 9 illustrates example selected equalized reverberation impulse responses formed from selections shown in FIG. 4.

Examples of the present method and system are now presented. In the first example, an embodiment cross-reverberates an electric guitar live with the impulse responses synthesized from Misirlou above. Spectrograms of the dry guitar and processed wet output are shown in FIG. 8. Selections from the set of equalized impulse responses used to process the guitar are shown in FIG. 9. For contrast, the corresponding unequalized impulse response spectrograms are shown in FIG. 5.

Figure 10:
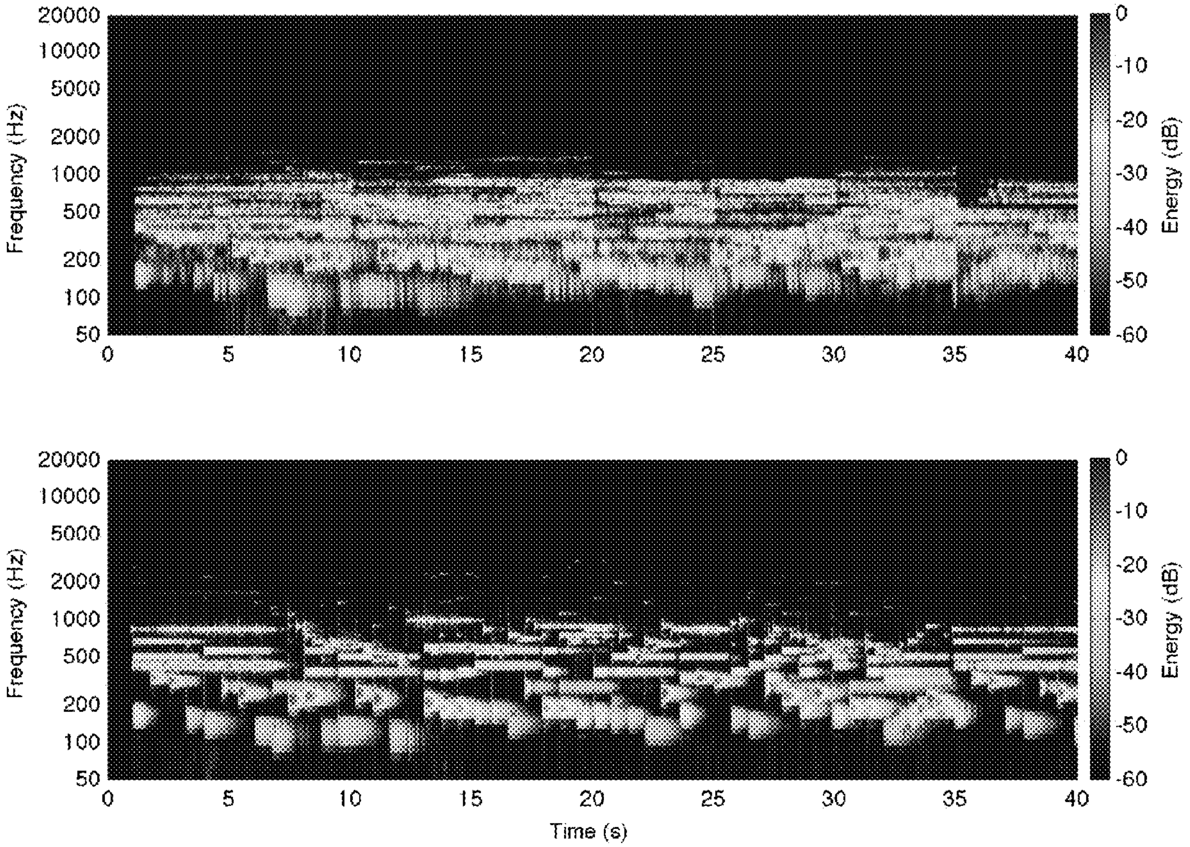
FIG. 10 illustrates an example auto-reverberation of Air on a G String, wet (top) and (bottom) spectrograms.
Figure 11:
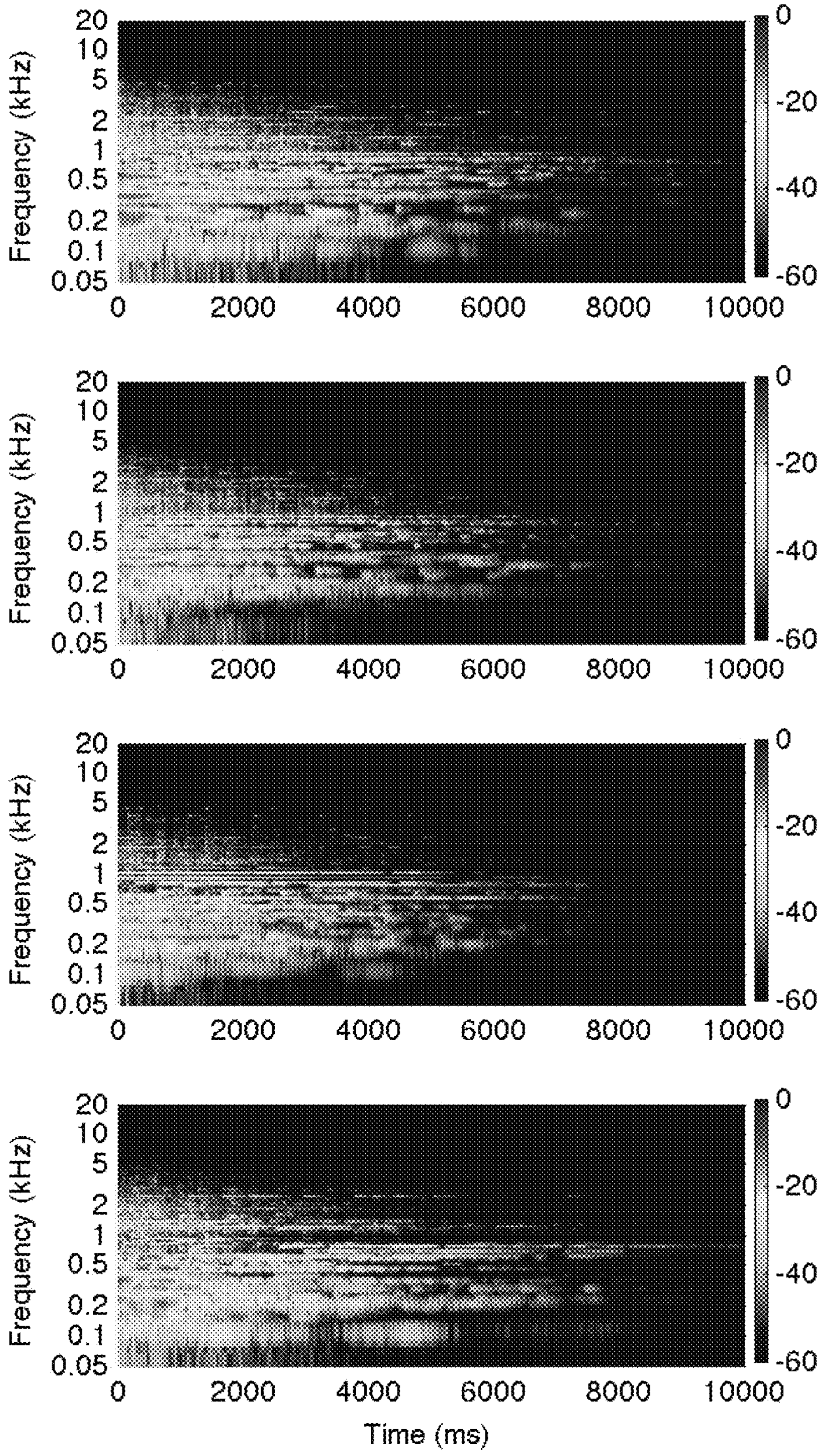
FIG. 11 illustrates example selected equalized reverberation impulse responses from the example of FIG. 10.
Figure 12:
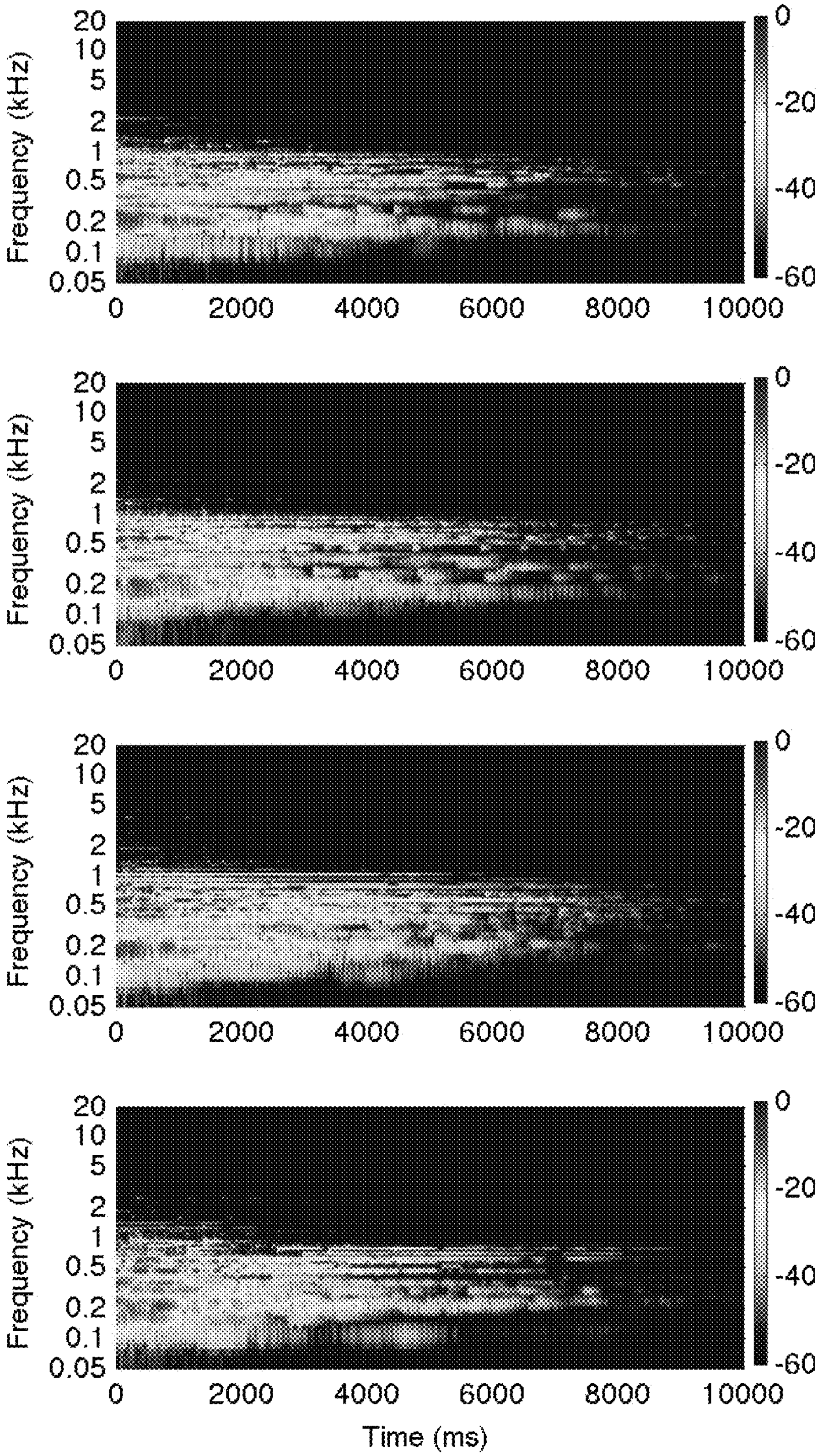
FIG. 12 illustrates example selected reverberation impulse responses from the example of FIG. 10.
Figure 13:
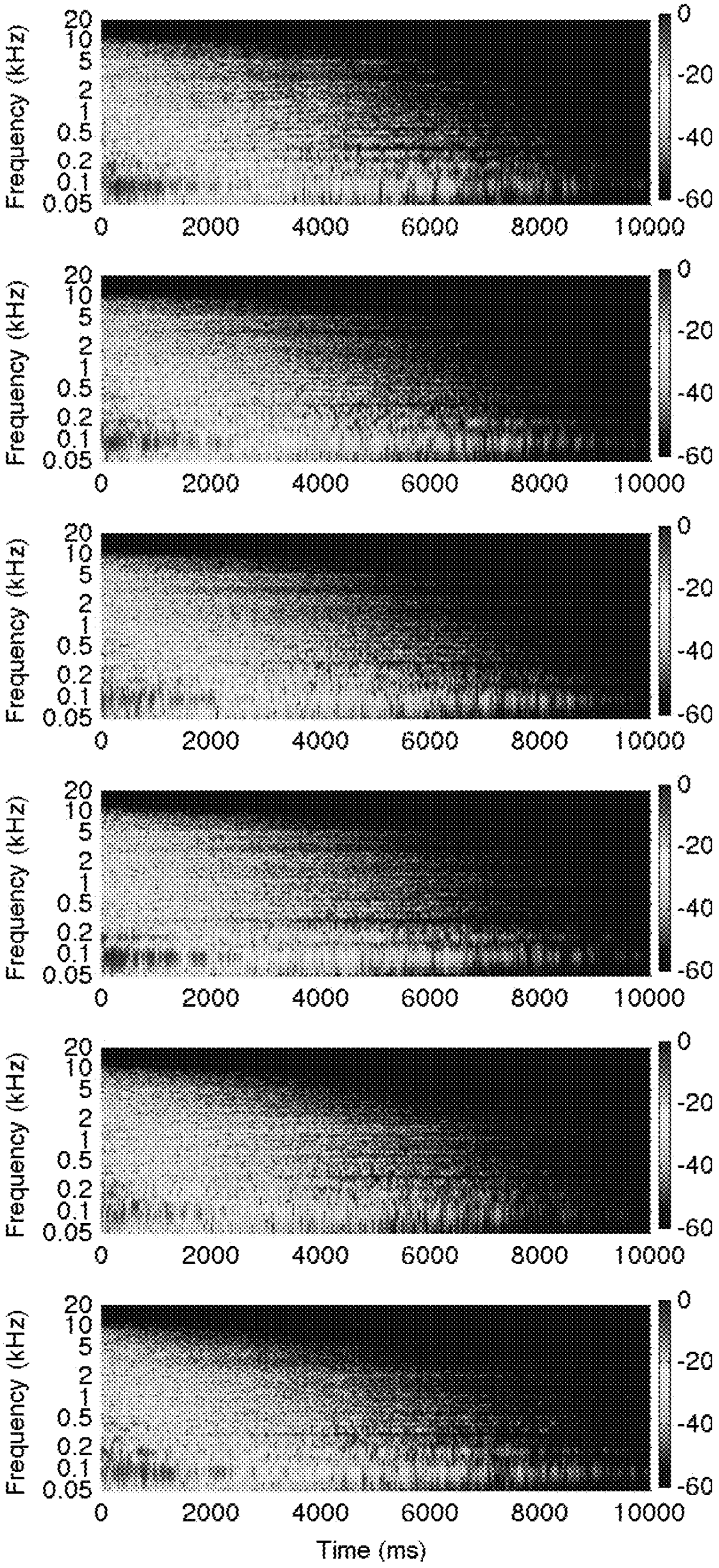
FIG. 13 illustrates example synthesized Impulse Response Spectrograms according to embodiments.

The second example applies the update scheme to have Air on a G-String (arranged for marimba by the Horsholm Percussion & Marimba Ensemble) (J. S. Bach. Orchestral Suite No. 3 in D major, BWV1068: Air ('Air on a G String') Fuga. Danacord DACOCD328. 200) reverberate itself. Example dry input signal and wet output signal spectrograms are shown in FIG. 10. Selected equalized and unequalized impulse response spectrograms are shown in FIG. 11 and FIG. 12, respectively.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably coupleable," to each other to achieve the desired functionality. Specific examples of operably coupleable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method comprising:
- identifying a plurality of segments from a corresponding plurality of different time ranges of an audio signal;
- mixing the plurality of identified segments to form a normalized response, and
- processing the normalized response according to a reverberation impulse response characteristic to produce a reverberation impulse response.

2. The method of claim 1, wherein the reverberation impulse response characteristic includes one of a wet-dry mix, equalization, predelay, and reverberation time.

3. The method of claim 1, wherein the audio signal is a multichannel audio signal.

4. The method of claim 1, wherein at least one segment of the plurality of segments is selected according to the timing of a feature in the at least one segment.

5. A method for reverberating an audio signal according to reverberation having the character of a source audio stream during selected time ranges comprising:
- for each of a plurality of time ranges, selecting and mixing audio stream segments starting in the time range as a step in forming a corresponding plurality of reverberation impulse responses; and
- processing a portion of the audio signal according to one of the reverberation impulse responses to obtain the reverberated audio signal.

6. The method of claim 5, wherein the audio signal and audio stream are from the same audio source.

7. The method of claim 5, wherein the plurality of reverberation impulse responses are combined interactively to produce a reverberation that evolves over time.

8. The method of claim 7, wherein at least one of the plurality of reverberation impulse responses is generated offline.

9. A method for presenting virtual acoustics comprising:
- obtaining an audio signal to be auralized and an audio stream to drive auralization;

forming a sequence of reverberation impulse responses, each formed from mixed selections of the audio stream; and applying the sequence of reverberation impulse responses in sequence to the audio signal to form an output signal.

10. The method of claim 1, wherein identifying the plurality of segments is performed for the audio signal and at least one other audio signal, such that the plurality of identified segments is derived from the audio signal and the at least one other audio signal.

* * * * *